July 15, 1930.  C. B. SMITH  1,770,863
MEASURING INSTRUMENT
Filed Sept. 26, 1929   2 Sheets-Sheet 1
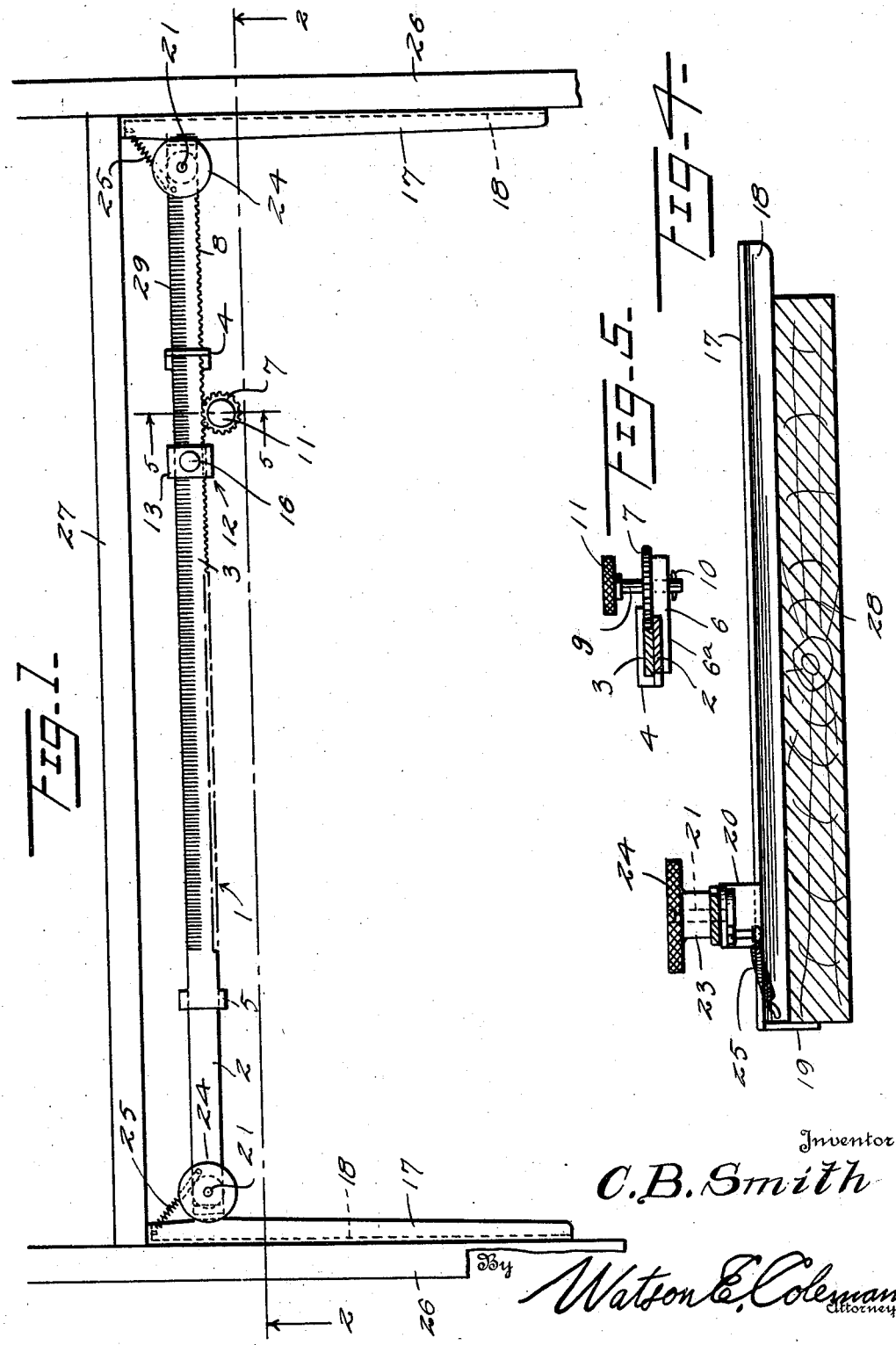
Inventor
C. B. Smith
By Watson E. Coleman
Attorney

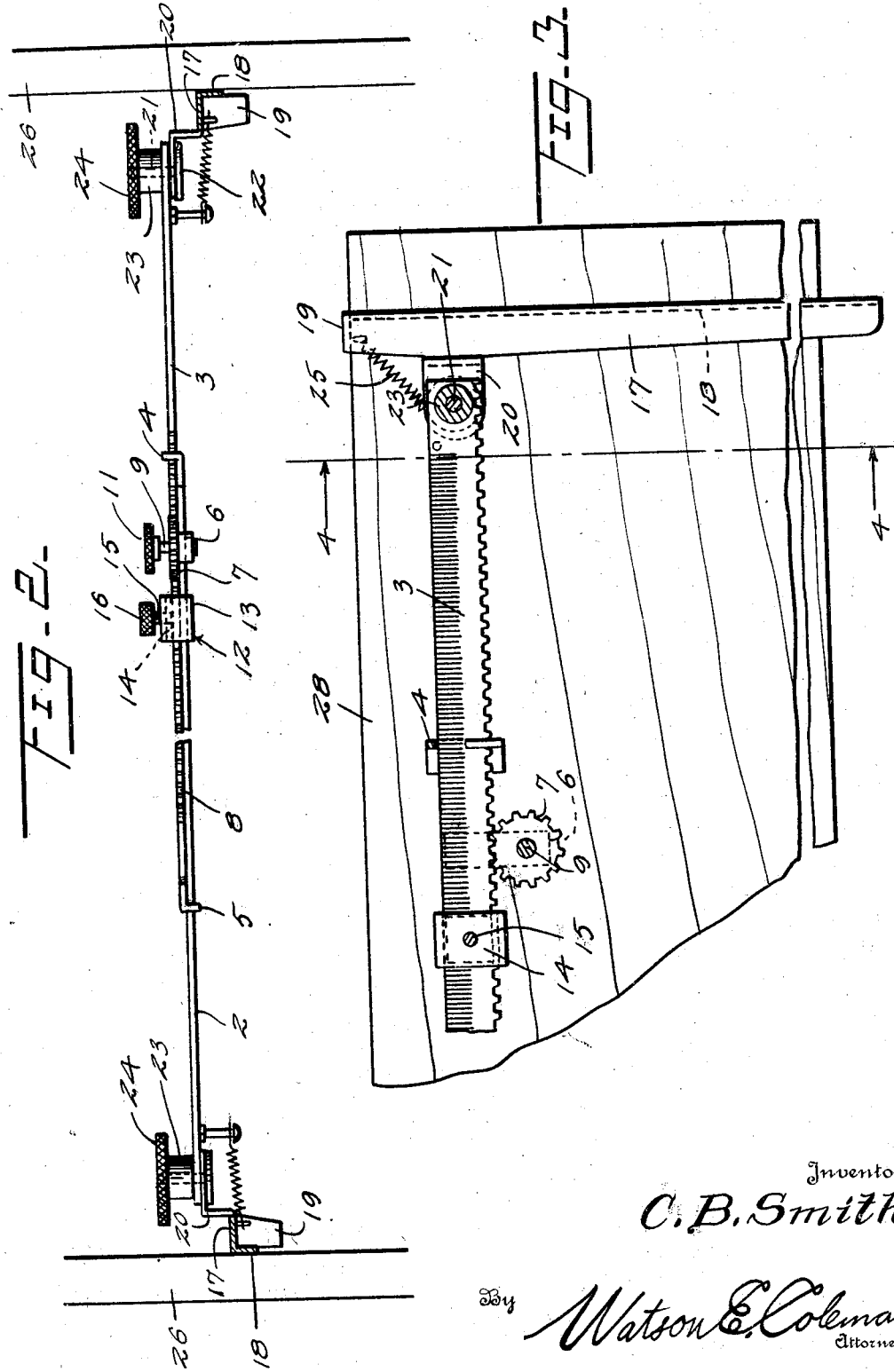

Patented July 15, 1930

1,770,863

UNITED STATES PATENT OFFICE

CLYDE B. SMITH, OF AKRON, OHIO

MEASURING INSTRUMENT

Application filed September 26, 1929. Serial No. 395,312.

This invention relates to measuring instruments, and has for one of its objects to provide a novel and simple instrument of this character through the medium of which the exact length of the treads of a stairway to be built between two walls may be readily ascertained.

This invention has for a further object to provide an instrument of the character stated which shall also be adapted to be used for the purpose of ascertaining the exact length of a door head, window head, baseboard or the like that is to be applied between two walls.

The invention has for a still further object to provide an instrument of the character stated which shall also be adapted to be used to measure off the length of a tread, door head, window head, baseboard or the like on the material from which it is to be cut.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a top plan view of the measuring instrument illustrating the manner in which it is adapted to be used while ascertaining the length of the treads of a stairway to be built between two walls;

Figure 2 is a sectional view taken on the vertical plane indicated by the line 2—2 of Figure 1;

Figure 3 is a view partly in top plan and partly in horizontal section of the instrument illustrating the manner in which it is adapted to be used to measure off the length of a tread on the material from which the tread is to be cut;

Figure 4 is a sectional view taken on the vertical plane indicated by the line 4—4 of Figure 3, and Figure 5 is a sectional view taken on the vertical plane indicated by the line 5—5 of Figure 1.

The measuring instrument comprises a bar 1 which is of sectional formation. The sections 2 and 3 of the bar 1 are arranged one upon the other and slidably connected together to permit the effective length of the bar to be varied. The bar sections 2 and 3 are provided at their inner ends with loops 4 and 5, respectively, which extend at right angles and in opposite directions therefrom. The loop 4 embraces the bar section 3, and the loop 5 embraces the bar section 2, to slidably connect the sections for relative endwise or longitudinal adjustment.

A bearing bracket 6 is carried by the bar section 2 near the inner end of the latter, and it contacts with and extends rearwardly from the rear edge of this section. The bearing bracket 6 is provided with a forwardly directed arm 6$^a$ which contacts with and is secured to the lower side of the bar section 2. The upper surface of the bearing bracket 6 and the corresponding surface of the bar section 2 are co-planar, and resting upon these surfaces is a pinion 7 which meshes with rack teeth 8 on the rear edge of the bar section 3.

A shaft 9, which extends through the pinion 7 and bearing bracket 6, is fixed to the former and journaled in the latter. The shaft 9 is secured to the bearing bracket 6 by the pinion 7 and by a cotter pin 10, the latter extending through the shaft at the lower side of the bearing bracket. To permit the pinion 7 to be readily turned when it is desired to increase or decrease the effective length of the bar 1, the shaft 9 is provided with a milled operating head 11.

The bar sections 2 and 3 are secured in their adjusted positions by means of a clamp 12 which comprises a yoke 13 secured to the bar section 2 and embracing the bar section 3, a friction block 14 arranged within the yoke 13 and resting upon the bar section 3, and a pressure screw 15 engaged with the upper side of the yoke and contacting with the friction block 14. The means for adjusting the bar sections 2 and 3, and the means for securing the bar sections in adjusted position, are closely related so as to permit of their convenient operation and control, and to permit it to be readily turned, the pressure screw 15 is provided with a milled operating head 16.

The bar sections 2 and 3 are provided at their outer ends with arms or blades 17 which extend forwardly and rearwardly from and are pivotally connected to the bar sections, the greater portion of the blades 17 extending rearwardly beyond the bar sections 2 and 3. The blades 17 are provided along their outer side edges with downwardly extending flanges 18, and are provided at their front end edges with downwardly extending stops 19 which extend below the flanges 18.

The arms 17 are provided at their inner side edges and near their front ends with upwardly and inwardly extending pivot lugs 20 which are connected to the outer ends of the rod sections 2 and 3 by bolts 21. The pivot lugs 20 contact with the lower sides of the rod sections 2 and 3, and the bolts 21 pass through the pivot lugs and rod sections and are provided with enlarged heads 22 contacting with the lower sides of the pivot lugs. Nuts 23, which are provided with milled operating heads 24, are threadedly engaged with the bolts 21 and cooperate with the bolt heads 22 in securing the pivot lugs 20 and consequently the blades 17 against accidental turning movement with respect to the rod sections 2 and 3. Contractile coil springs 25 are terminally secured to the bar sections 2 and 3 and to the front ends of the blades 17, and they constantly tend to swing the blades outwardly on their pivots 21.

In practice, when it is desired to ascertain the length of the treads of stairs to be erected between two walls, the instrument, with the blades 17 secured in right angular or in substantially such position with respect to the bar 1, is arranged between the skirting boards of the stairway with the blades out of contact with such boards and with the stops 19 of the blades in contact with the riser boards, such boards being shown in Figure 1 and designated 26 and 27, respectively. The blades 17 are freed for movement about their pivots 21 by slightly backing the nuts 23 off the bolts 21. The rear ends of the blades 17 are then moved by the springs 25 into contact with the skirting boards 26. After the rear ends of the blades 17 are in contact with these boards, the blade sections 2 and 3 are freed for relative adjustment by backing the screw 15.

The rod sections 2 and 3 are then moved away from each other, through the medium of the pinion 7 until the blades 17 are in contact throughout their entire length with the skirting boards 26. The rod sections 2 and 3 and the blades 17 are secured in their relative positions by turning up the screw 15 and the nuts 23. After this has been done, the instrument is applied to the board from which the tread is to be cut, with the plates 17 resting upon and extending transversely of the board and with the stops 19 contacting with one longitudinal edge of the board, as shown in Figures 3 and 4 wherein the board is designated 28. The board is marked off with the outer sides of the flanges 18 serving as guides, and thereafter the board is sawed off along the marks, with the result that a tread of the exact size is produced.

The bar section 3 is provided with graduations 29 which are spaced one-sixteenth of an inch apart and with which the loop 4 cooperates as a pointer. The graduations 29 enable an over-sized tread of a predetermined length to be made if desired, and when a tread of this character is to be produced, the clamp 12 is loosened and the bar sections 2 and 3 adjusted relatively outward one-sixteenth of an inch or for a greater distance. After this has been done, the bar sections 2 and 3 are secured in adjusted position by the clamp 12 and thereafter the board marked off in the manner heretofore stated.

The instrument is adapted to be used for the purpose of ascertaining the length of a door head, window head or baseboard by arranging it between the walls between which the door head, window head or baseboard is to be applied, by freeing the blades 17 so as to permit their rear ends to be moved into contact with the walls by the springs 25, by adjusting the bar sections 2 and 3 until the blades are in full contact with the walls, and by thereafter locking the blades and bar sections in their adjusted positions.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. A measuring instrument of the character set forth, comprising a bar consisting of sections, means connecting the bar sections for relative endwise or longitudinal adjustment, means for adjusting the bar sections, means for securing the bar sections in adjusted position, blades pivoted to the outer ends of the bar sections, contractile springs secured to the blades and bar sections, and means for releasably securing the blades against pivotal movement.

2. A measuring instrument of the character set forth, comprising a bar consisting of sections, means connecting the bar sections for relative endwise or longitudinal adjustment, means for adjusting the bar sections, means for securing the bar sections in adjusted position, a blade pivotally connected adjacent one of its ends to the outer end of each bar section, contractile coil springs secured to the bar sections and such ends of the blades, and means for releasably securing the blades against pivotal movement.

3. A measuring instrument of the character set forth, comprising a bar consisting of sections, means connecting the bar sections for relative endwise or longitudinal adjustment, means for adjusting the bar sections, means for securing the bar sections in adjusted position, a blade pivoted near one of its ends to the outer end of each bar section and provided at said end with a stop angularly related thereto, contractile springs secured to the bar sections and to said ends of the blades, and means for releasably securing the blades against pivotal movement.

4. A measuring instrument of the character set forth, comprising a bar consisting of sections arranged one upon the other, means connecting the bar sections for relative endwise or longitudinal adjustment, means for adjusting the bar sections, means for securing the bar sections in adjusted position, a blade pivoted near one of its ends to the outer end of each bar section, the blades being provided at their outer side edges with flanges and at said ends with angularly extending stops projecting below the flanges, and means for releasably securing the blades against pivotal movement.

5. A measuring instrument of the character set forth, comprising a bar consisting of sections arranged one upon the other for relative endwise or longitudinal adjustment, loops carried by the inner end of each bar section and the loop of one bar section embracing the other bar section, a bearing bracket secured to one bar section and having one side thereof arranged in alinement with one side of said bar section, a pinion resting upon said sides, teeth formed on the other bar section and engaged by the pinion, a shaft fixed to the pinion and journaled in the bracket, said pinion and teeth providing means by which the bar sections may be adjusted relatively, means for securing the bar sections in adjusted position, blades pivoted to the outer ends of the bar sections, and means releasably securing the blades against pivotal movement.

6. A measuring instrument of the character set forth, comprising a bar consisting of relatively adjustable sections, a loop carried by an end of each bar section and the loop of one bar section embracing the other bar section, one bar section being provided with graduations with which the loop of the other bar section cooperates as a pointer, means for adjusting the bar sections, means for securing the bar sections in adjusted position, blades pivoted to the other ends of the bar sections, contractile springs connected to the bar sections and blades, and means for securing the blades against pivotal movement.

In testimony whereof I hereunto affix my signature.

CLYDE B. SMITH.